US012736557B2

(12) United States Patent
De Pascalis et al.

(10) Patent No.: US 12,736,557 B2
(45) Date of Patent: Sep. 15, 2026

(54) SELF-TEST ARCHITECTURE FOR MEMS ACCELEROMETER: HUMIDITY-PROOF, FULLY DIFFERENTIAL DESIGN AND FULL MASS CONTROL

(71) Applicant: STMicroelectronics International N.V., Geneva (CH)

(72) Inventors: Daniele De Pascalis, Buccinasco (IT); Massimo Orio, Milan (IT); Martina Rizzo, Milan (IT); Lorenzo Benvenuti, Lamporecchio (IT); Francesco Rizzini, Passirano (IT); Nicolo' Manca, Turin (IT)

(73) Assignee: STMicroelectronics International N.V., Geneva (CH)

( * ) Notice: Subject to any disclaimer, the term of this patent is extended or adjusted under 35 U.S.C. 154(b) by 205 days.

(21) Appl. No.: 18/676,950

(22) Filed: May 29, 2024

(65) Prior Publication Data

US 2025/0370001 A1 Dec. 4, 2025

(51) Int. Cl.
*G01P 15/125* (2006.01)
*G01P 21/00* (2006.01)

(52) U.S. Cl.
CPC ............ *G01P 15/125* (2013.01); *G01P 21/00* (2013.01)

(58) Field of Classification Search
CPC .................................................... G01P 15/125
See application file for complete search history.

(56) References Cited

U.S. PATENT DOCUMENTS 7,462,999 B2 12/2008 Mitchell et al.
9,218,065 B2 12/2015 Mahameed et al.
9,644,961 B2 5/2017 Aaltonen
11,307,218 B2 * 4/2022 Hughes .................. G01P 21/00
11,320,452 B2 * 5/2022 Hu ...................... G01P 15/0802
2013/0265070 A1 10/2013 Kleks et al.
2016/0202286 A1 7/2016 Aaltonen et al.
(Continued)

FOREIGN PATENT DOCUMENTS

EP 4170356 A1 4/2023
WO 2021236492 A1 11/2021
WO 2023107195 A1 6/2023

*Primary Examiner* — Erika J. Villaluna
(74) *Attorney, Agent, or Firm* — Crowe & Dunlevy LLC

(57) ABSTRACT

An accelerometer includes first and second stator-electrodes associated with a first-rotor, third and fourth stator-electrodes associated with a second-rotor, a first capacitance formed between the first-rotor and first stator-electrode, a second capacitance formed between the first-rotor and second stator-electrode, a third capacitance formed between the second-rotor and third stator-electrode, and a fourth capacitance formed between the second-rotor and fourth stator-electrode. A drive-circuit generates first and second periodic anti-phase stator drive-signals, and third and fourth periodic anti-phase stator drive-signals. To self-test, the drive-circuit applies the first, second, third, and fourth stator drive-signals to the first, second, third, and fourth stator-electrodes, and drives the first and second stator drive-signals with different voltage-swings but drives the third and fourth stator drive-signals with a same voltage-swing. A capacitance-to-voltage converter has a first-input coupled to the first and second capacitances, and a second-input coupled to the third and fourth capacitances.

21 Claims, 5 Drawing Sheets

(56) References Cited

U.S. PATENT DOCUMENTS

| | | | |
|---|---|---|---|
| 2017/0227569 | A1 | 8/2017 | Alwardi et al. |
| 2020/0011702 | A1 | 1/2020 | Clark |
| 2020/0408805 | A1 | 12/2020 | Hu et al. |
| 2021/0190813 | A1 | 6/2021 | Folz et al. |

* cited by examiner

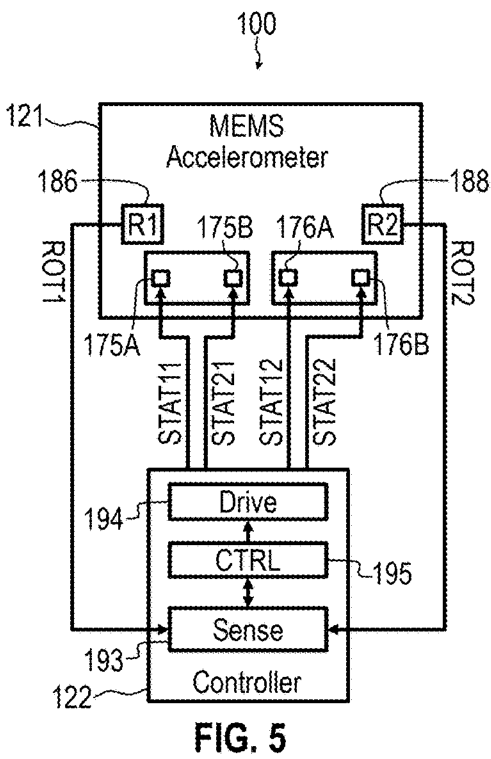
FIG. 5
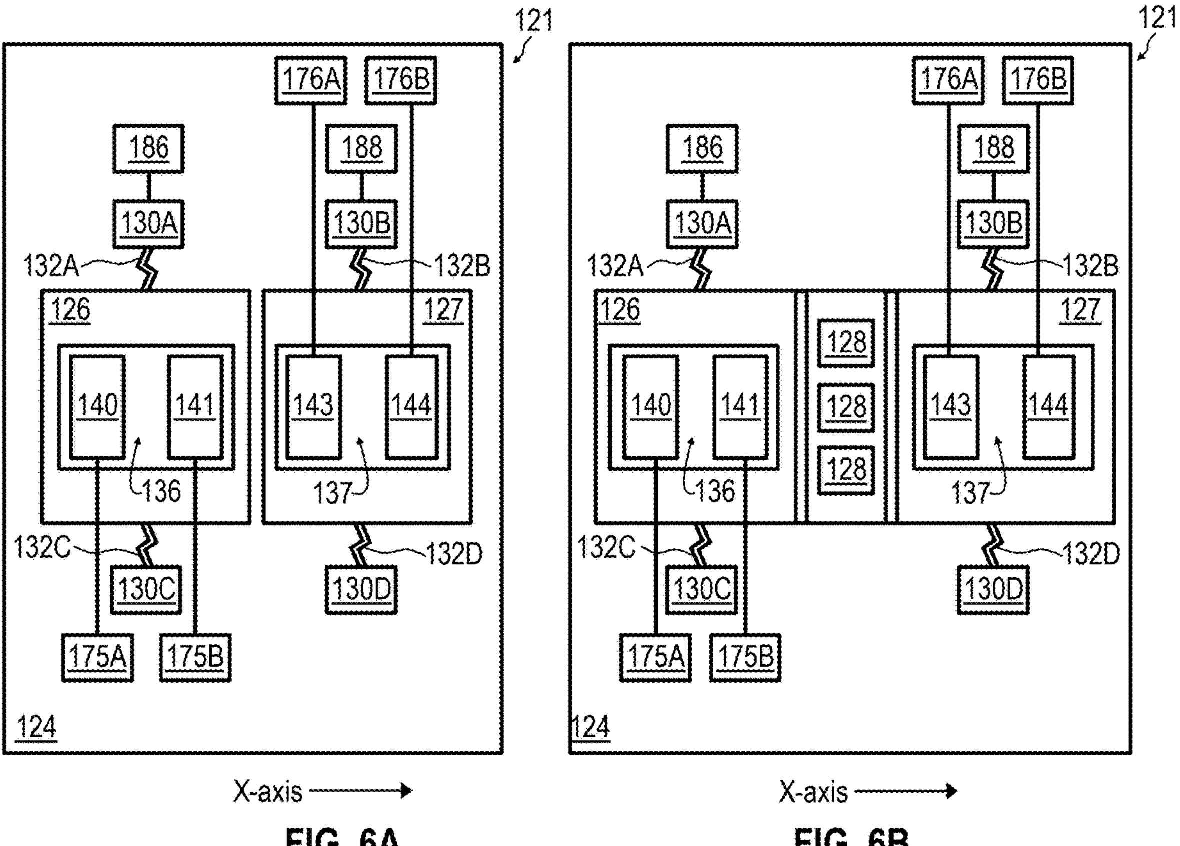
FIG. 6A
FIG. 6B

SELF-TEST ARCHITECTURE FOR MEMS ACCELEROMETER: HUMIDITY-PROOF, FULLY DIFFERENTIAL DESIGN AND FULL MASS CONTROL

TECHNICAL FIELD

This disclosure is directed to the field of micro-electromechanical (MEMS) accelerometers and, in particular, to a driving and self-test structure for such MEMS accelerometers that permits accurate self-test results even in the presence of moisture penetration in the assembly package. In fact, MEMS die and an application-specific integration circuit (ASIC) die are mainly assembled by bonding wire in a low cost plastic package, where the molding compound utilized is not able to assure a hermetic seal.

BACKGROUND

Micro-electromechanical (MEMS) accelerometers are miniature devices that measure acceleration forces, which can be static, like the force of gravity, or dynamic, such as movement or vibrations. These devices combine mechanical and electrical components that work together to detect changes in acceleration. They are typically formed by a microscale mass attached to a spring, which moves under acceleration. This movement is then converted into an electrical signal, which can be measured and processed. MEMS accelerometers are widely used due to their small size, low power consumption, and high accuracy. For example, MEMS accelerometers may be used for orientation detection in smartphones and tablets, may be used in the airbag system of an automobile to detect collisions, etc.

A sample known MEMS accelerometer 21 is now described with reference to FIG. 1, showing the electrical connections between different components. The MEMS accelerometer 21 includes two rotors R1, R2, each electrically connected to a respective rotor contact pad 86, 88, and two stators S1, S2, each electrically connected to a respective stator contact pad 75, 76, implementing a fully differential MEMS structure.

A controller 22 includes drive circuitry 94 that, under control of a control circuit 95, generates and applies anti-phase periodic rotor drive signals ROT1, ROT2 to the rotor contact pads 86, 88. The controller 22 includes sense circuitry 93 that receives differential sensed stator signals STAT1, STAT2 from stator contact pads 75, 76, processes those stator signals, and cooperates with the control circuit 95 to determine an acceleration value to which the MEMS accelerometer 21 is subject.

The mechanical arrangement and layout of the MEMS accelerometer 21 is now described with reference to FIG. 2A. The MEMS accelerometer 21 comprises a silicon substrate 24, the top surface of which is shown in FIG. 2A. First and second rotors 26, 27 (corresponding to R1 and R2) are suspended on the substrate 24. The rotors 26 is affixed to and suspended over the substrate 24 by flexures 32A, 32C which extend between the rotor 26 and respective anchoring regions 30A, 30C. The rotor 27 is affixed to and suspended over the substrate 24 by flexures 32B, 32D which extend between the rotor 27 and respective anchoring regions 30B, 30D. The flexures 32A-32D permit movement of the rotors 26, 27 with respect to the substrate 24.

Openings 36, 37 are defined within rotors 26, 27. Stator electrodes 40, 41 are disposed within opening 36, and are capacitively coupled to rotor 26. Stator electrodes 43, 44 are disposed within opening 37, and are capacitively coupled to rotor 27. Rotor contacts 86, 88 are electrically connected to rotors 26, 27. Stator electrode 40 is connected to stator electrode 43, therefore both are electrically connected to stator contact 75, while stator electrode 41 is connected to stator electrode 44, and therefore both are electrically connected to stator contact 76.

The electrical connections of different components of the sense circuitry 93 is now described with reference to FIG. 3. In the following:

- Capacitor C11 represents the capacitance between the stator electrode 40 and the rotor 26, and has a capacitance value of C11=C0+ΔC, with ΔC being a capacitance variation associated with displacement Δx of the rotor 26 along the x-axis, and with C0 being a rest capacitance of capacitor C11;
- Capacitor C21 represents the capacitance between the stator electrode 41 and the rotor 26, and has a capacitance value of C21=C0−ΔC, with ΔC being a capacitance variation associated with displacement Δx of the rotor 26 along the x-axis, and with C0 being a rest capacitance of capacitor C21;
- Capacitor C12 represents the capacitance between the stator electrode 44 and the rotor 27, and has a capacitance of C12=C0+ΔC, with ΔC being a capacitance variation associated with displacement Δx of the rotor 27 along the x-axis, and with C0 being a rest capacitance of capacitor C12; and
- Capacitor C22 represents the capacitance between the stator electrode 43 and the rotor 27, and has a capacitance of C22=C0−ΔC, with ΔC being a capacitance variation associated with displacement Δx of the rotor 27 along the x-axis, and with C0 being a rest capacitance of capacitor C22.

Current IC11 is a function of the product between the rotor signal ROT1 and the capacitance of capacitor C11. Current IC22 is a function of the product between the signal ROT2 and the capacitance of capacitor C22. The sum of currents IC11 and IC22 yields stator signal STAT1.

Current IC21 is a function of the product between the rotor signal ROT1 and the capacitance of capacitor C21. Current IC12 is a function of the product between ROT2 and the capacitance of capacitor C12. The sum of currents IC21 and IC12 yields the current STAT2.

In response to an acceleration of the MEMS accelerometer 20, capacitor C11 and capacitor C12 have, in magnitude, a same capacitance variation, while similarly, the capacitor C21 and capacitor C22 have, in magnitude, a same capacitance variation. As a result, the capacitance to voltage (C2V) converter arrangement of the differential amplifier 99 and its feedback capacitors Cf1, Cf2 generate a differential output representative of the acceleration that the MEMS accelerometer 21 has been subjected to. This is a generic accelerometer structure, where two proof masses (rotors) mechanically and electrically separated are used to implement a fully differential accelerometer. A variant of such MEMS accelerometer structure is presented in United States Patent Publication No. 2024/0010490 (incorporated by reference), where, as shown in FIG. 2B, a dielectric isolation layer is used to implement a mechanical coupling between the two rotors, and therefore the two proof masses. The following considerations and disclosure are valid for both solutions.

It is desirable to be able to test the MEMS accelerometer 20 to verify proper operation without external acceleration stimulus, implementing a self-test operating mode. To perform a self-test without the use of additional electrode and saving the die area otherwise necessary for a dedicated electrode, the proof masses must be stimulated by a differential electrostatic force between ROT1 and ROT2, where the electrostatic force on ROT1 is proportional to the difference between the ROT1-STAT1 effective voltage and the ROT1-STAT2 effective voltage, and where the electrostatic force on ROT2 is proportional to the difference between the ROT2-STAT1 effective voltage and the ROT2-STAT2 effective voltage. Since the amplifier 99 is arranged as a differential amplifier and it works by forcing the same voltage between its inputs, one of the stators contact 75, 76 must be disconnected from input of amplifier 99 and forced to a different voltage and, additionally, there must be a different average voltage between rotor signals ROT1 and ROT2. As a result, there will be a net deflection of the proof masses because the electrostatic force on ROT1 is different than the electrostatic force on ROT2. Therefore, as shown in FIG. 4A, rotor signals ROT1 and ROT2 are generated in anti-phase manner and with different average values, while switch S1 is closed by forcing stator 44 to ground, and S2 opened in order to disconnect the stator 44 itself from the inverting input terminal of amplifier 99 and ensure that the amplifier works properly, with the output of the amplifier 99 representing the mechanical deviation between the rotors 26, 27. A first error in self-test value could be generated by the presence of parasitic capacitance between Rotors and Stators (for example the Cparax in FIG. 4B): when Cparax is connected to ground to perform self-test operation, the contribution of the parasitic capacitance is not read by the amplifier 99 in the self test configuration, affecting the mechanical deviation signal that is proportional to the difference between the doubled output of amplifier 99 in the self-test mode and the output of the amplifier 99 during normal operation; therefore, an auto-zero phase needs to be implemented.

The auto-zero phase is now described. As shown in FIG. 4B, switch S2 is opened to disconnect the stator 44 from the input terminal of the amplifier 99 and switch S3 is closed to connect the stator 44 to the input common mode voltage of the amplifier 99, while switch S1 is opened. As the electrostatic force on each rotor 26, 27 is zero, since STAT2 is forced to input common mode voltage value of the amplifier 99 (the same voltage value of STAT1), the rotors 26, 27 will not have any displacement (a part the external signal). The voltage measured at the output of the amplifier 99 will be proportional to the parasitic capacitance Cparax, plus external acceleration. The correct value for the self-test operation can be therefore computed as the difference between the value in self-test operation minus the value in the auto-zeroing phase.

However, if the MEMS accelerometer 20 has been penetrated by humidity, an electrolytic cell may be formed in the molding compound between the stator lines, and so between the two input terminals of amplifier 99. The electrical effect of this is modeled in the version of the MEMS accelerometer 20 shown in FIG. 4A, with the electrolytic cell modeled as a Randles cell formed by parasitic capacitance CDL1, electrolytic resistance REL, and parasitic capacitance CDL2 connected in series between the input terminals of the amplifier 99. The result of this is charge sharing between feedback capacitor Cf1 and parasitic capacitances CDL1, CDL2, which introduces an error into the output of the amplifier 99, affecting the self-test value.

This is clearly undesirable. Further development is needed in order to avoid this situation.

SUMMARY

Disclosed herein is an accelerometer device including a sensor package containing: a first rotor; a first stator electrode and a second stator electrode associated with the first rotor; a second rotor; a third stator electrode and a fourth stator electrode associated with the second rotor; a first capacitance formed between the first rotor and the first stator electrode; a second capacitance formed between the first rotor and the second stator electrode; a third capacitance formed between the second rotor and the third stator electrode; and a fourth capacitance formed between the second rotor and the fourth stator electrode.

A drive circuit is configured to generate: a first stator drive signal and a second stator drive signal, the first stator drive signal and second stator drive signal being periodic signals in an anti-phase relationship to one another; and a third stator drive signal and a fourth stator drive signal, the third stator drive signal and fourth stator drive signal being periodic signals in an anti-phase relationship to one another.

In a first case of a self-testing mode (electrostatic force on rotor 1), the drive circuit applies the first stator drive signal to the first stator electrode, the second stator drive signal to the second stator electrode, the third stator drive signal to the third stator electrode, and the fourth stator drive signal to the fourth stator electrode, with the first and second stator drive signals being driven with different respective voltage swings, and with the third and fourth stator drive signals being driven with a same voltage swing.

In a second case of the self-testing mode (electrostatic force on rotor 2), the drive circuit applies the first stator drive signal to the first stator electrode, the second stator drive signal to the second stator electrode, the third stator drive signal to the third stator electrode, and the fourth stator drive signal to the fourth stator electrode, with the first and second stator drive signals being driven with a same voltage swing, and with the third and fourth stator drive signals being driven with different respective voltage swings.

A capacitance to voltage converter has a first input coupled to the first capacitance and the second capacitance, and a second input coupled to the third capacitance and the fourth capacitance.

In the first case of the self-testing mode, the third and fourth stator drive signals may be periodic and may vary between ground and one-half a full drive voltage, and in the second case of the self-testing mode, the first and second stator drive signals may be periodic and may vary between ground and one-half the full drive voltage.

In the first case of the self-testing mode, the first stator drive signal may be periodic and may vary between one-half the full drive voltage and the full drive voltage and the second stator drive signal is periodic and varies between ground and one-half the full drive voltage, and in the second case of the self-testing mode, the third stator drive signal may be periodic and may vary between ground and one-half the full drive voltage and the fourth stator drive signal is periodic and varies between one-half the full drive voltage and the full drive voltage.

In the first case of the self-testing mode, the third and fourth stator drive signals may be equal to the input common mode voltage of the reading amplifier, and in the second case of the self-testing mode, the first and second stator drive signals may be equal to the input common mode voltage of the reading amplifier.

In the first case of the self-testing mode, the first stator drive signal may be periodic and may vary between one-half a full drive voltage and the full drive voltage and the second stator drive signal is periodic and varies the between ground and one-half the full drive voltage, and in the second case of the self-testing mode, the third stator drive signal may be periodic and may vary between ground and one-half the full drive voltage and the fourth stator drive signal is periodic and varies the between one-half the full drive voltage and the full drive voltage.

In a standard operating mode, the first and second stator drive signals may be driven with a same voltage swing, and the third and fourth stator drive signals may be driven with a same voltage swing. A voltage representative of an acceleration experienced by the sensor package may be produced at an output of the capacitance to voltage converter.

In a standard operating mode, the first and second stator drive signals may be driven with a same voltage swing, and the third and fourth stator drive signals may be driven with a same voltage swing. The voltage representative of an acceleration experienced by the sensor package may be produced as a differential voltage at first and second differential outputs of the capacitance to voltage converter.

BRIEF DESCRIPTION OF THE DRAWINGS

FIG. 5 is a block diagram of a MEMS accelerometer and its associated controller, disclosed herein.

FIG. 6A is a top view of the physical structure of the MEMS accelerometer of FIG. 5.

FIG. 6B is a top view of an alternate physical structure for the MEMS accelerometer of FIG. 5.

DETAILED DESCRIPTION

Figure 1:
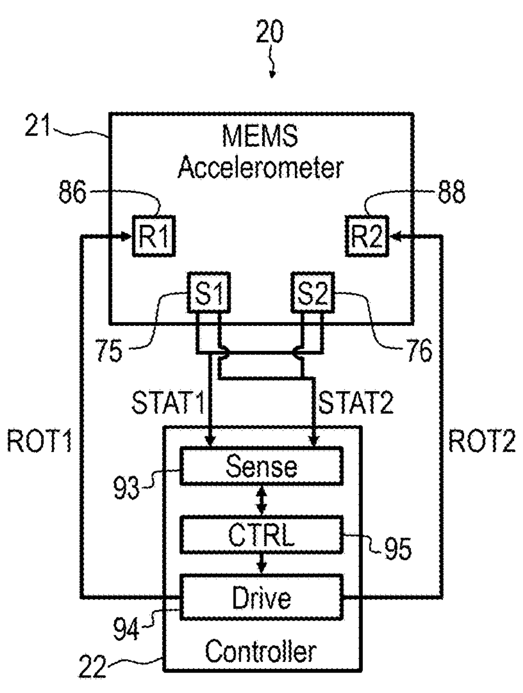
FIG. 1 is a block diagram of a known MEMS accelerometer and its associated controller.
Figure 2A:
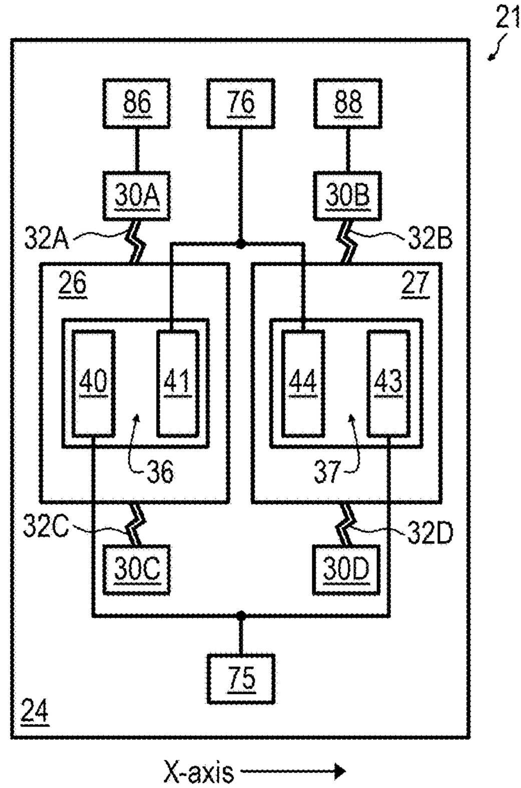
FIG. 2A is a top view of the physical structure of the MEMS accelerometer of FIG. 1.

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein. This disclosure is applicable to any MEMS accelerometer structure, x-axis, y-axis, as well out of plane (z-axis) accelerometer structure (bulky, parallel plates and/or comb fingers based) with two or more proof masses (rotors) mechanically and electrically separated, as well as in case of an accelerometer structure with two or more proof masses (rotors) mechanically coupled and electrically isolated. Therefore, this disclosure is applicable to the MEMS structure of FIG. 2A, as well to the MEMS structure of FIG. 2B. Furthermore, the disclosure is applicable regardless of the technology utilized for packaging (plastic, ceramic, other), regardless of whatever the technology for the connection between MEMS and ASIC die may be (e.g., bonding wire, wafer-to-wafer bonding, other).

Note that in the following description, any resistor or resistance mentioned is an actual device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is an actual device, unless stated otherwise, and is not a parasitic element, unless stated otherwise.

Now described with reference to FIG. 5 is a MEMS accelerometer 100 which eliminates the drawbacks associated with self-test of prior art MEMS accelerometers. The MEMS accelerometer 100 includes two rotors R1, R2 each electrically connected to a respective rotor contact pad 186, 188, and four stators S11, S21, S12, S22 each electrically connected to a different pair of stator contact pads 175A, 175B and 176A, 176B.

A controller 122 includes drive circuitry 194 that, under control of a control circuit 195, generates and applies two sets of anti-phase periodic stator drive signals STAT11, STAT21 and STAT12, STAT22 to the stator contact pads 175A, 175B and 176A, 176B. The controller 122 includes sense circuitry 193 that receives differential sensed rotor signals ROT1, ROT2 from rotor contact pads 186, 188, processes those rotor signals, and cooperates with the control circuit 195 to determine an acceleration value to which the MEMS accelerometer 21 is subject.

The mechanical arrangement and layout of the MEMS accelerometer 121 is now described with reference to FIG. 6A. The MEMS accelerometer 121 comprises a silicon substrate 124, the top surface of which is shown in FIG. 6A. First and second rotors 126, 127 (corresponding to R1 and R2) are suspended on the substrate 124. The rotors 126 is affixed to and suspended over the substrate 124 by flexures 132A, 132C which extend between the rotor 126 and respective anchoring regions 130A, 130C. The rotor 127 is affixed to and suspended over the substrate 124 by flexures 132B, 132D which extend between the rotor 127 and respective anchoring regions 130B, 130D. The flexures 132A-132D permit movement of the rotors 126, 127 with respect to the substrate 124.

Openings 136, 137 are defined within rotors 126, 127. Stator electrodes 140, 141 are disposed within opening 136, and are capacitively coupled to rotor 126. Stator electrodes 143, 144 are disposed within opening 137, and are capacitively coupled to rotor 127. Rotor contacts 186, 188 are electrically connected to rotors 126, 127. Stator electrodes 140, 141 and 143, 144 are electrically connected to stator contacts 175A, 175B and 176A, 176B.

Figure 7:
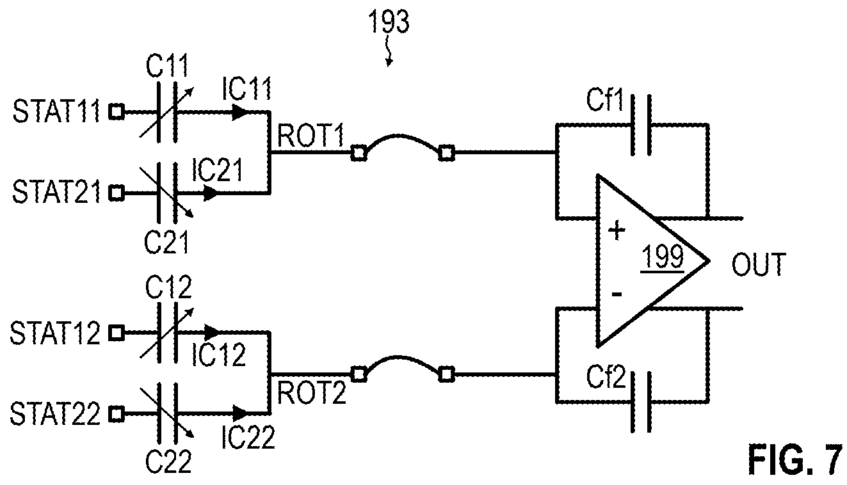
FIG. 7 is a schematic diagram of the MEMS accelerometer of FIG. 5.

The electrical connections of different components of the sense circuitry 193 is now described with reference to FIG. 7. In the following:

Capacitor C11 represents the capacitance between the stator electrode 140 and the rotor 126, and has a capacitance value of $C11=C0+\Delta C$, with $\Delta C$ being a capacitance variation associated with displacement $\Delta x$ of the rotor 126 along the x-axis, and with C0 being a rest capacitance of capacitor C11;

- Capacitor C21 represents the capacitance between the stator electrode 141 and the rotor 126, and has a capacitance value of C21=C0−ΔC, with ΔC being a capacitance variation associated with displacement Δx of the rotor 126 along the x-axis, and with C0 being a rest capacitance of capacitor C21;
- Capacitor C12 represents the capacitance between the stator electrode 143 and the rotor 127, and has a capacitance of C12=C0+ΔC, with ΔC being a capacitance variation associated with displacement Δx of the rotor 127 along the x-axis, and with C0 being a rest capacitance of capacitor C12; and
- Capacitor C22 represents the capacitance between the stator electrode 144 and the rotor 127, and has a capacitance of C22=C0−ΔC, with ΔC being a capacitance variation associated with displacement Δx of the rotor 127 along the x-axis, and with C0 being a rest capacitance of capacitor C22.

Current IC11 is a function of the product between the stator drive signal STAT11 and the capacitance of capacitor C11. Current IC21 is a function of the product between the stator drive signal STAT21 and the capacitance of capacitor C21. The sum of currents IC11 and IC21 yields rotor signal ROT1.

Current IC12 is a function of the product between the stator drive signal STAT12 and the capacitance of capacitor C12. Current IC22 is a function of the product between stator drive signal STAT22 and the capacitance of capacitor C22. The sum of currents IC12 and IC22 yields rotor signal ROT2.

Figure 8:
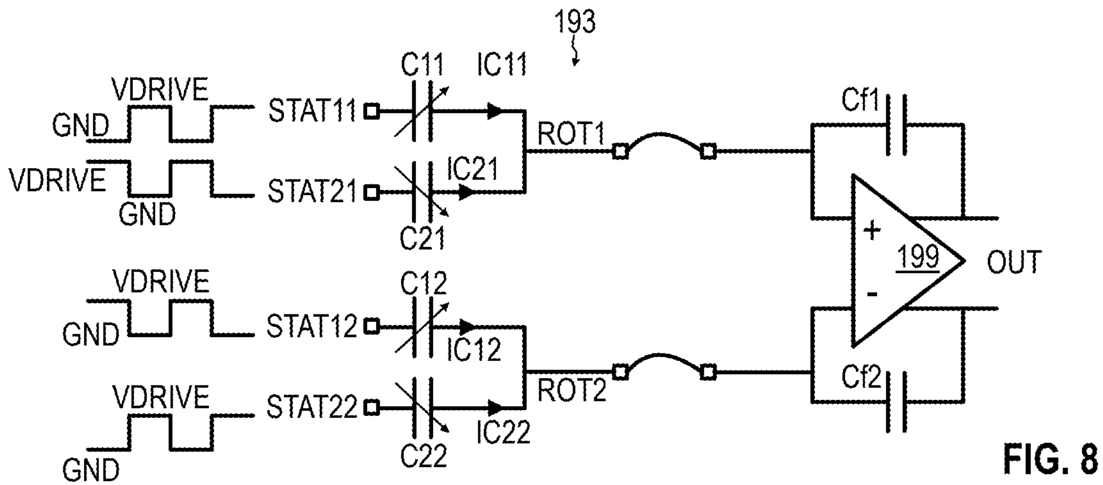
FIG. 8 is a schematic diagram of the MEMS accelerometer of FIG. 5 during standard operation.

Standard operation to detect acceleration that the MEMS accelerometer 21 has been subjected to is now described with additional reference to FIG. 8, which shows the two sets of anti-phase periodic stator drive signals STAT11, STAT21 and STAT12, STAT22 applied to the stator contact pads 175A, 175B and 176A, 176B. Here, each signal of the two sets of anti-phase periodic stator drive signals STAT11, STAT21 and STAT12, STAT22 rises to a drive voltage VDRIVE when it transitions high and falls to ground when it transitions low. As a result of the application of the two sets of anti-phase periodic stator drive signals STAT11, STAT21 and STAT12, STAT22 to the stator electrodes 140, 141 and 143, 144, in the absence of an external acceleration (other than gravity), rotors 126, 127 do not undergo a mechanical deflection.

In response to an acceleration experienced by the MEMS accelerometer 20 (other than gravity), rotors 126, 127 do undergo a mechanical deflection, and capacitor C11 and capacitor C12 have, in magnitude, a same capacitance variation, while similarly, the capacitor C21 and capacitor C22 have, in magnitude, a same capacitance variation. As a result, the capacitance to voltage (C2V) converter arrangement of the differential amplifier 99 and its feedback capacitors Cf1, Cf2 generate a differential output representative of the acceleration that the MEMS accelerometer 21 has been subjected to.

Self-testing is performed for each rotor/stator combination separately and is performed differently than standard operation.

Figure 9:
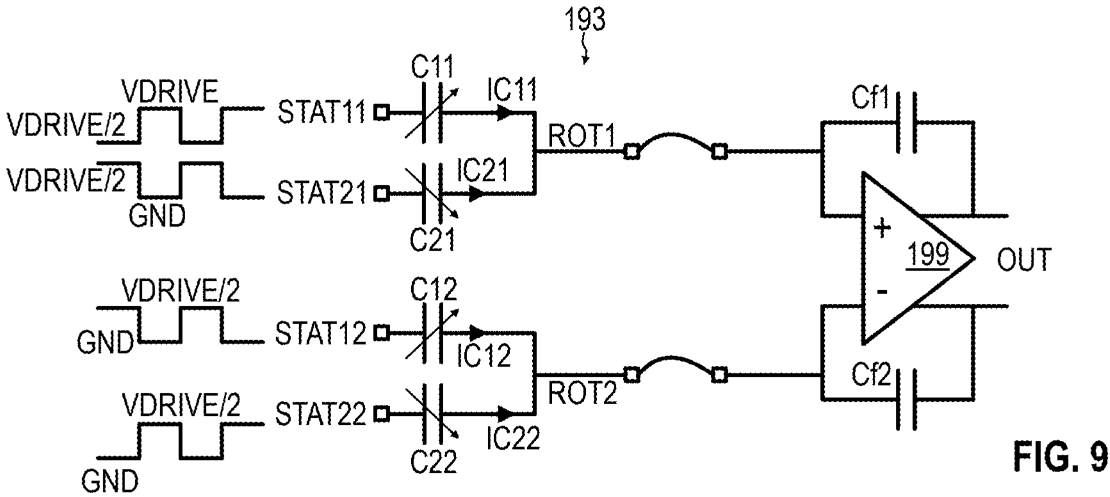
FIGS. 9-10 are schematic diagrams of the MEMS accelerometer of FIG. 5 during self-testing.

The self-testing operation for testing rotor 126 and its stator electrodes 140, 141 is now described with reference to FIG. 9. In this configuration, the control circuit 195 causes the drive circuity 194 to connect stator electrodes 143, 144 to anti-phase periodic stator drive signals STAT12, STAT22 that vary between the two same voltages, e.g., between one-half the drive voltage (i.e., VDRIVE/2) and ground, and connects rotor electrodes 186, 188 to the amplifier 199, while generating and providing anti-phase periodic stator drive signals STAT11, STAT21 to stator electrodes 140, 141. Differently than during standard operation, stator drive signal STAT11 rises from one-half of the full drive voltage to the full drive voltage (i.e., VDRIVE) when it transitions high and falls from the full drive voltage to one-half the full drive voltage when it transitions low, while signal STAT21 transitions from ground to one-half the full drive voltage when it transitions high and falls from one-half the full drive voltage to ground when it transitions low. Therefore, rotor 126 undergoes a mechanical deflection even in the absence of an acceleration (other than gravity) during self-testing when testing rotor 126 and its stator electrodes 140, 141. This deflection causes a change in the capacitance of capacitors C11, C21, and the output of the amplifier 199 will be a voltage representative of this deflection.

Figure 10:
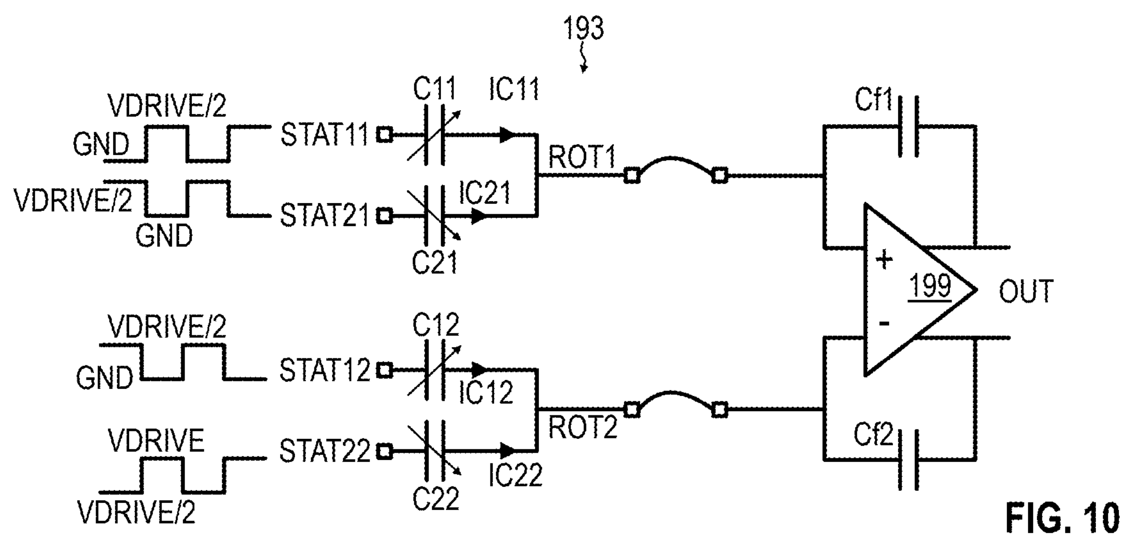

The self-testing operation for testing rotor 127 and its stator electrodes 143, 144 is now described with reference to FIG. 10. In this configuration, the control circuit 195 causes the drive circuity 194 to connect stator electrodes 140, 141 to anti-phase periodic stator drive signals STAT11, STAT21 that vary between the two same voltages (e.g., between one-half the drive voltage and ground), and connects rotor electrodes 186, 188 to the amplifier 199, while generating and providing anti-phase periodic stator drive signals STAT12, STAT22 to stator electrodes 143, 144. Differently than during standard operation, stator drive signal STAT12 rises from ground to one-half the full drive voltage when it transitions high and falls from one-half the full drive voltage to ground when it transitions low, while signal STAT22 transitions from one-half of the full drive voltage to the full drive voltage when it transitions high and falls from the full drive voltage to one-half the full drive voltage when it transitions low. Therefore, rotor 127 undergoes a mechanical deflection even in the absence of an acceleration (other than gravity) during self-testing when testing rotor 127 and its stator electrodes 143, 144. This deflection causes a change in the capacitance of capacitors C12, C22, and the output of the amplifier 199 will be a voltage representative of this deflection.

As an alternative self-testing operation for testing rotor 126 and its stator electrodes 140, 141, instead of connecting the stator electrodes 143, 144 to anti-phase periodic stator drive signals that vary between the two same voltages, the stator electrodes 143, 144 may be connected to the input common mode voltage of the amplifier 199, in order to avoid contribution to the amplifier output coming from rotor 127 (e.g., offset, external acceleration, self-test deviation), thus focusing the measurement on the rotor 126. Likewise, for testing rotor 127 and its stator electrodes 143, 144, instead of connecting the stator electrodes 140, 141 to anti-phase periodic stator drive signals that vary between the two same voltages, the stator electrodes 140, 141 may be connected to the input common mode voltage of the amplifier 199, in order to avoid contribution to the amplifier output coming from the rotor 126 (e.g., offset, external acceleration, self-test deviation), thus focusing the measurement on the rotor 127.

Figure 11:
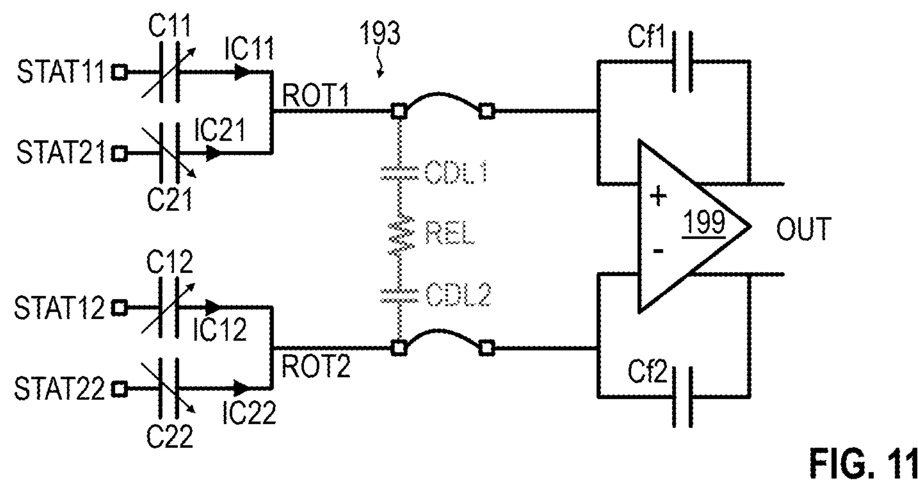
FIG. 11 is a schematic diagram of the MEMS accelerometer of FIG. 5 when affected by moisture in the assembly package.
Figure 12:
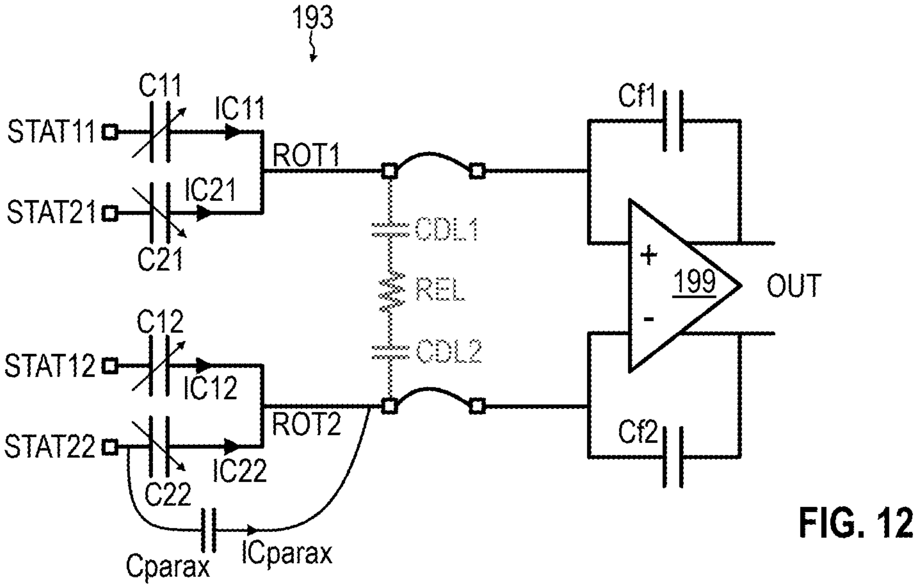
FIG. 12 is a schematic diagram of the MEMS accelerometer of FIG. 5 when affected by moisture in the assembly package, showing how an auto-zero operation is not required with this design.

Recall the concern in the prior art design with an electrolytic cell effectively being formed between amplifier inputs as a result of humidity penetration, this electrolytic cell resulting in charge transfer to the amplifier input from the stators connected to the amplifier 199 during self-test operations, and error being introduced into the final reading. Differently, in the design of the MEMS accelerometer 100, the rotors 126, 127 are connected to the differential amplifier 199 (thus the mechanical deflection is now performed by changing the stimuli applied to the stators only), so considering that the amplifier itself forces its inputs to be equal in voltage (the input common mode voltage value), there will be no charge injection (no voltage difference between the two rotors) from the CDL1-REL-CDL2 network to Cf, where the CDL1-REL-CDL2 network is representing the electrolytic cell being formed in case of humidity penetration in molding compound, as shown in FIG. 11. Moreover, the design of the MEMS accelerometer 100 does not require the performance of an auto-zeroing when switching from normal operation mode to self-test mode because any passive parasitic capacitance in parallel with the capacitance of the capacitors C11, C21, C12 and C22 being read is always connected to the inputs of the amplifier 199, so their contribution in terms of current ICparax does not change during the switchover (as shown in FIG. 12).

Figure 2B:
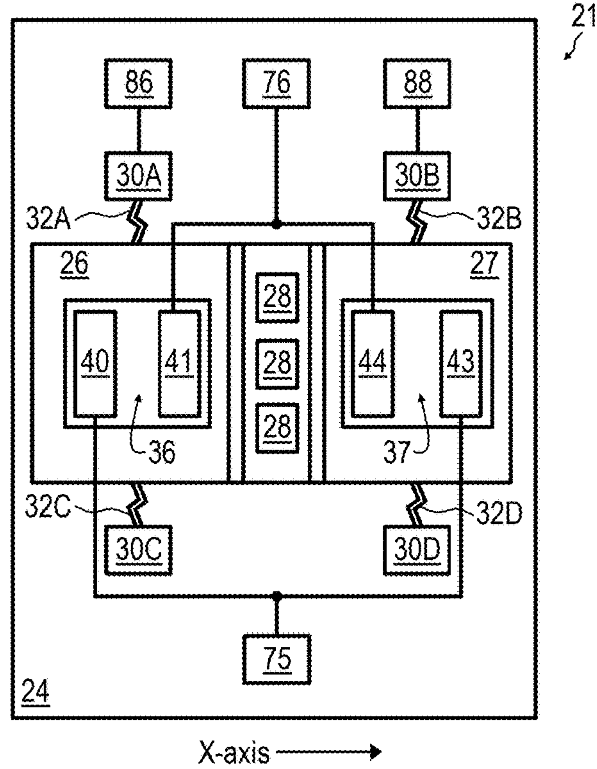
FIG. 2B is a top view of an alternate physical structure for the MEMS accelerometer of FIG. 1.
Figures 3, 4A, 4B:
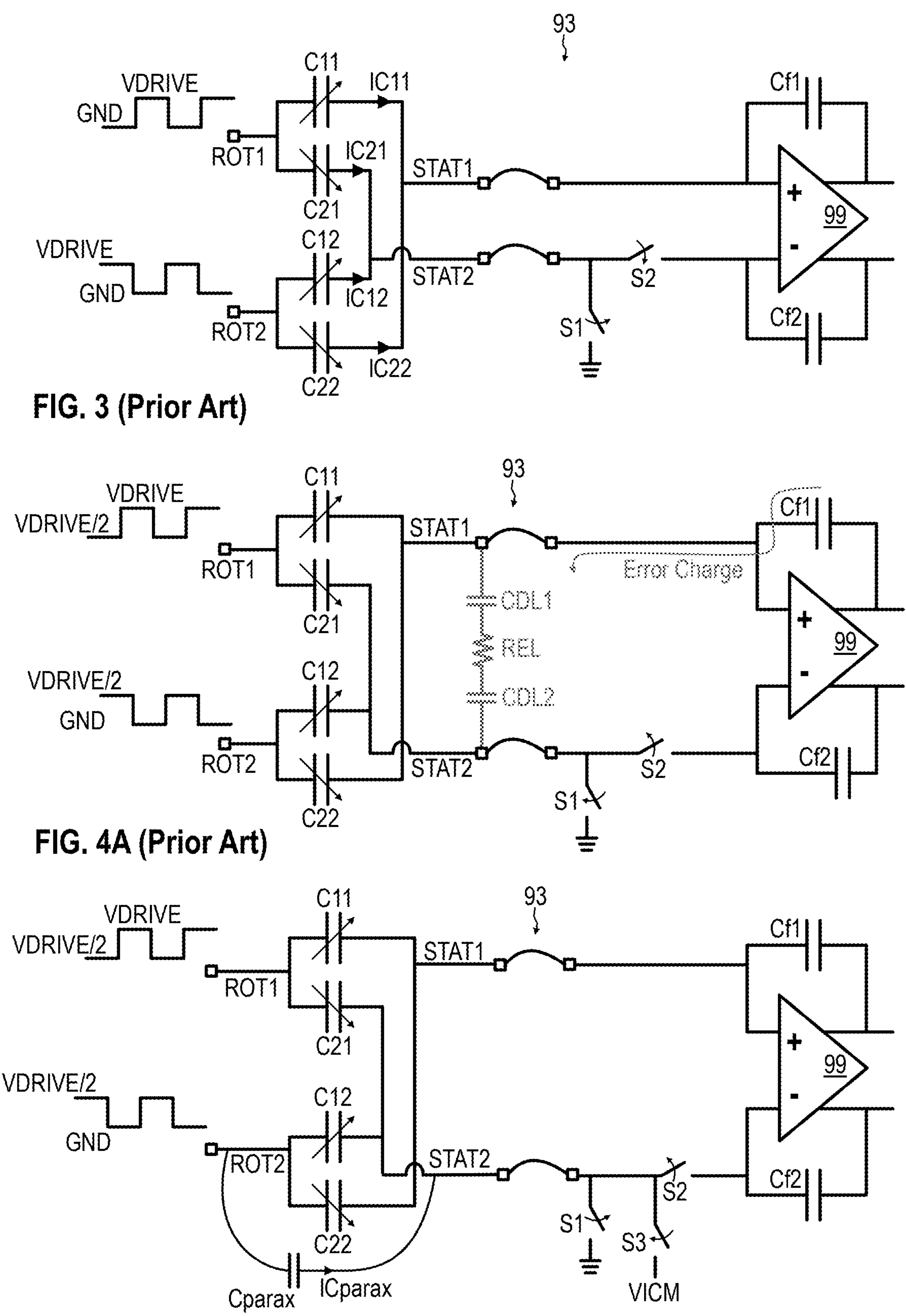
FIG. 3 is a schematic diagram of the MEMS accelerometer of FIG. 1 during standard operation.
FIG. 4A is a schematic diagram of the MEMS accelerometer of FIG. 1 during self-testing when affected by moisture in the assembly package.
FIG. 4B is a schematic diagram of the MEMS accelerometer of FIG. 1 when performing an auto-zero operation.

It should be evident that the same approach can be applied in the case of FIG. 2B, where an additional layer is used to realize a mechanical coupling between the two rotors 26, 27 together with a dielectric isolation, so the structure of FIG. 2B can be rearranged as shown in FIG. 6B.

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. An accelerometer device, comprising:

a sensor package comprising:

a first rotor;

a first stator electrode and a second stator electrode associated with the first rotor;

a second rotor;

a third stator electrode and a fourth stator electrode associated with the second rotor;

a first capacitance formed between the first rotor and the first stator electrode;

a second capacitance formed between the first rotor and the second stator electrode;

a third capacitance formed between the second rotor and the third stator electrode; and a fourth capacitance formed between the second rotor and the fourth stator electrode;

a drive circuit configured to generate:

a first stator drive signal and a second stator drive signal, the first stator drive signal and second stator drive signal being periodic signals in an anti-phase relationship to one another; and a third stator drive signal and a fourth stator drive signal, the third stator drive signal and fourth stator drive signal being periodic signals in an anti-phase relationship to one another;

wherein, in a first case of a self-testing mode for electrostatic force on the first rotor, the drive circuit applies the first stator drive signal to the first stator electrode, the second stator drive signal to the second stator electrode, the third stator drive signal to the third stator electrode, and the fourth stator drive signal to the fourth stator electrode, with the first and second stator drive signals being driven with different respective voltage swings, and with the third and fourth stator drive signals being driven with a same voltage swing;

wherein, in a second case of the self-testing mode for electrostatic force on the second rotor, the drive circuit applies the first stator drive signal to the first stator electrode, the second stator drive signal to the second stator electrode, the third stator drive signal to the third stator electrode, and the fourth stator drive signal to the fourth stator electrode, with the first and second stator drive signals being driven with a same voltage swing, and with the third and fourth stator drive signals being driven with different respective voltage swings; and a capacitance to voltage converter having a first input coupled to the first capacitance and the second capacitance, and a second input coupled to the third capacitance and the fourth capacitance.

2. The accelerometer device of claim 1, wherein, in the first case of the self-testing mode, the third and fourth stator drive signals are periodic and vary between ground and one-half a full drive voltage; and wherein, in the second case of the self-testing mode, the first and second stator drive signals are periodic and vary between ground and one-half the full drive voltage.

3. The accelerometer device of claim 2, wherein, in the first case of the self-testing mode, the first stator drive signal is periodic and varies between one-half the full drive voltage and the full drive voltage and the second stator drive signal is periodic and varies between ground and one-half the full drive voltage; and wherein, in the second case of the self-testing mode, the third stator drive signal is periodic and varies between ground and one-half the full drive voltage and the fourth stator drive signal is periodic and varies between one-half the full drive voltage and the full drive voltage.

4. The accelerometer device of claim 1, wherein, in the first case of the self-testing mode, the third and fourth stator drive signals are equal to an input common mode voltage of a reading amplifier; and wherein, in the second case of the self-testing mode, the first and second stator drive signals are equal to the input common mode voltage of the reading amplifier.

5. The accelerometer device of claim 4, wherein, in the first case of the self-testing mode, the first stator drive signal is periodic and varies between one-half a full drive voltage and the full drive voltage and the second stator drive signal is periodic and varies between ground and one-half the full drive voltage; and wherein, in the second case of the self-testing mode, the third stator drive signal is periodic and varies between ground and one-half the full drive voltage and the fourth stator drive signal is periodic and varies between one-half the full drive voltage and the full drive voltage.

6. The accelerometer device of claim 1, wherein, in a standard operating mode, the first and second stator drive signals are driven with a same voltage swing, and the third and fourth stator drive signals are driven with a same voltage swing; and wherein a voltage representative of an acceleration experienced by the sensor package is produced at an output of the capacitance to voltage converter.

7. The accelerometer device of claim 1, wherein, in a standard operating mode, the first and second stator drive signals are driven with a same voltage swing, and the third and fourth stator drive signals are driven with a same voltage swing; and wherein a voltage representative of an acceleration experienced by the sensor package is produced as a differential voltage at first and second differential outputs of the capacitance to voltage converter.

8. A method of operating an accelerometer device, the method comprising:

generating a first stator drive signal and a second stator drive signal, the first stator drive signal and second stator drive signal being periodic signals in an anti-phase relationship to one another;

generating a third stator drive signal and a fourth stator drive signal, the third stator drive signal and fourth stator drive signal being periodic signals in an anti-phase relationship to one another;

in a first case of a self-testing mode, applying the first stator drive signal to a first stator electrode, the second stator drive signal to a second stator electrode, the third stator drive signal to a third stator electrode, and the fourth stator drive signal to a fourth stator electrode, with the first and second stator drive signals being driven with different respective voltage swings, and with the third and fourth stator drive signals being driven with a same voltage swing; and in a second case of the self-testing mode, applying the first stator drive signal to the first stator electrode, the second stator drive signal to the second stator electrode, the third stator drive signal to the third stator electrode, and the fourth stator drive signal to the fourth stator electrode, with the first and second stator drive signals being driven with a same voltage swing, and with the third and fourth stator drive signals being driven with different respective voltage swings.

9. The method of claim 8, further generating an output voltage based upon a first capacitance formed between a first rotor and the first stator electrode, a second capacitance formed between the first rotor and the second stator electrode, a third capacitance formed between a second rotor and the third stator electrode, and a fourth capacitance formed between the second rotor and the fourth stator electrode, the output voltage being representative of an acceleration.

10. The method of claim 8, wherein, in the first case of the self-testing mode, the third and fourth stator drive signals are periodic and vary between ground and one-half a full drive voltage; and wherein, in the second case of the self-testing mode, the first and second stator drive signals are periodic and vary between ground and one-half the full drive voltage.

11. The method of claim 10, wherein, in the first case of the self-testing mode, the first stator drive signal is periodic and varies between one-half the full drive voltage and the full drive voltage and the second stator drive signal is periodic and varies between ground and one-half the full drive voltage; and wherein, in the second case of the self-testing mode, the third stator drive signal is periodic and varies between ground and one-half the full drive voltage and the fourth stator drive signal is periodic and varies between one-half the full drive voltage and the full drive voltage.

12. The method of claim 8, wherein, in the first case of the self-testing mode, the third and fourth stator drive signals are equal to an input common mode voltage of a reading amplifier; and wherein, in the second case of the self-testing mode, the first and second stator drive signals are equal to the input common mode voltage of the reading amplifier.

13. The method of claim 12, wherein, in the first case of the self-testing mode, the first stator drive signal is periodic and varies between one-half a full drive voltage and the full drive voltage and the second stator drive signal is periodic and varies the between ground and one-half the full drive voltage; and wherein, in the second case of the self-testing mode, the third stator drive signal is periodic and varies between ground and one-half the full drive voltage and the fourth stator drive signal is periodic and varies the between one-half the full drive voltage and the full drive voltage.

14. The method of claim 8, wherein, in a standard operating mode, the first and second stator drive signals are driven with a same voltage swing, and the third and fourth stator drive signals are driven with a same voltage swing.

15. An accelerometer device, comprising:

a sensor package comprising:

a first rotor;

first and second stator electrodes associated with the first rotor;

a second rotor;

third and fourth stator electrodes associated with the second rotor; and first, second, third, and fourth capacitances formed between the first and second rotors and their respective first, second, third, and fourth stator electrodes;

a drive circuit generating:

first and second stator drive signals, being periodic and in an anti-phase relationship; and third and fourth stator drive signals, being periodic and in an anti-phase relationship;

wherein in a first self-testing mode, the drive circuit applies the first, second, third, and fourth stator drive signals to the first, second, third, and fourth stator electrodes, with the first and second stator drive signals having different voltage swings, and the third and fourth stator drive signals having a same voltage swing;

wherein in a second self-testing mode, the drive circuit applies the first, second, third, and fourth stator drive signals to the first, second, third, and fourth stator electrodes, with the first and second stator drive signals having the same voltage swing, and the third and fourth stator drive signals having different voltage swings; and a capacitance to voltage converter with inputs coupled to the first, second, third, and fourth capacitances.

16. The accelerometer device of claim 15, wherein, in the first self-testing mode, the third and fourth stator drive signals are periodic and vary between ground and one-half a full drive voltage; and wherein, in the second self-testing mode, the first and second stator drive signals are periodic and vary between ground and one-half the full drive voltage.

17. The accelerometer device of claim 16, wherein, in the first self-testing mode, the first stator drive signal is periodic and varies between one-half the full drive voltage and the full drive voltage, and the second stator drive signal is periodic and varies between ground and one-half the full drive voltage; and wherein, in the second self-testing mode, the third stator drive signal is periodic and varies between ground and one-half the full drive voltage, and the fourth stator drive signal is periodic and varies between one-half the full drive voltage and the full drive voltage.

18. The accelerometer device of claim 15, wherein, in the first self-testing mode, the third and fourth stator drive signals are equal to an input common mode voltage of a reading amplifier; and wherein, in the second self-testing mode, the first and second stator drive signals are equal to the input common mode voltage of the reading amplifier.

19. The accelerometer device of claim 18, wherein, in the first self-testing mode, the first stator drive signal is periodic and varies between one-half a full drive voltage and the full drive voltage, and the second stator drive signal is periodic and varies between ground and one-half the full drive voltage; and wherein, in the second self-testing mode, the third stator drive signal is periodic and varies between ground and one-half the full drive voltage, and the fourth stator drive signal is periodic and varies between one-half the full drive voltage and the full drive voltage.

20. The accelerometer device of claim 15, wherein, in a standard operating mode, the first and second stator drive signals are driven with a same voltage swing, and the third and fourth stator drive signals are driven with a same voltage swing; and wherein a voltage representative of an acceleration experienced by the sensor package is produced at an output of the capacitance to voltage converter.

21. The accelerometer device of claim 15, wherein, in a standard operating mode, the first and second stator drive signals are driven with a same voltage swing, and the third and fourth stator drive signals are driven with a same voltage swing; and wherein the voltage representative of an acceleration experienced by the sensor package is produced as a differential voltage at first and second differential outputs of the capacitance to voltage converter.

* * * * *